United States Patent [19]
Huang

[11] Patent Number: 5,678,919
[45] Date of Patent: Oct. 21, 1997

[54] ILLUMINATING SCISSORS

[76] Inventor: Chien Che Huang, P.O. Box 82-144, Taipei, Taiwan

[21] Appl. No.: 751,756

[22] Filed: Nov. 18, 1996

[51] Int. Cl.$^6$ .................................................. B25B 23/18
[52] U.S. Cl. ......................... 362/119; 362/109; 362/253
[58] Field of Search ............................. 362/109, 119, 362/120, 253; 30/1, 123

[56] References Cited

U.S. PATENT DOCUMENTS

| | | | |
|---|---|---|---|
| 2,515,292 | 7/1950 | Carr | 362/119 X |
| 2,854,564 | 9/1958 | Cohen et al. | 362/119 X |
| 5,568,698 | 10/1996 | Harding et al. | 362/119 X |

Primary Examiner—Stephen F. Husar
Attorney, Agent, or Firm—Alfred Lei

[57] ABSTRACT

Illuminating scissors including a pair of blades pivotally joined in an intermediate portion thereof by a bolt engaged with a hexagonal lock nut and each having a handle at an end thereof, a cylindrical housing mounted on one of the blades, a light bulb arranged in a cylindrical edge of the cylindrical housing, a battery fitted in the cylindrical housing and electrically connected with the light bulb, and a switch mounted on the cylindrical housing and electrically connected with the battery and the light bulb, and a linking rod having a first end connected with the housing and a second end with one of the blades, whereby the illuminating scissors will direct light onto the cutting surface.

4 Claims, 7 Drawing Sheets

# ILLUMINATING SCISSORS

BACKGROUND OF THE INVENTION

1. Field of the Invention

This invention relates to a pair of scissors and in particular to one which are provided with an illuminating device.

2. Description of the Prior Art

The conventional scissors (see FIG. 11) is an instrument consisting of two blades Joined in the middle with a ring at the end of each through which one puts one's thumb and a finger in order to open and close them. Each blade acts as a first-class lever. The sharpened edges of the blades form two wedges that cut with great force into a material from opposite directions. As they met, they part the material sideways. However, in case of insufficient intensity of light, the eyesight of an user may be damaged unconsciously.

Therefore, it is an object of the present invention to provide illuminating scissors which can obviate and mitigate the above-mentioned drawbacks.

SUMMARY OF THE INVENTION

This invention relates to illuminating scissors.

It is the primary object of the present invention to provide illuminating scissors which will direct light onto the cutting surface.

It is still another object of the present invention to provide illuminating scissors which is simple in construction.

It is still another object of the present invention to provide illuminating scissors which is fit for practical use.

It is still another object of the present invention to provide illuminating scissors which is easy to assemble.

It is a further object of the present invention to provide illuminating scissors which is low in cost.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
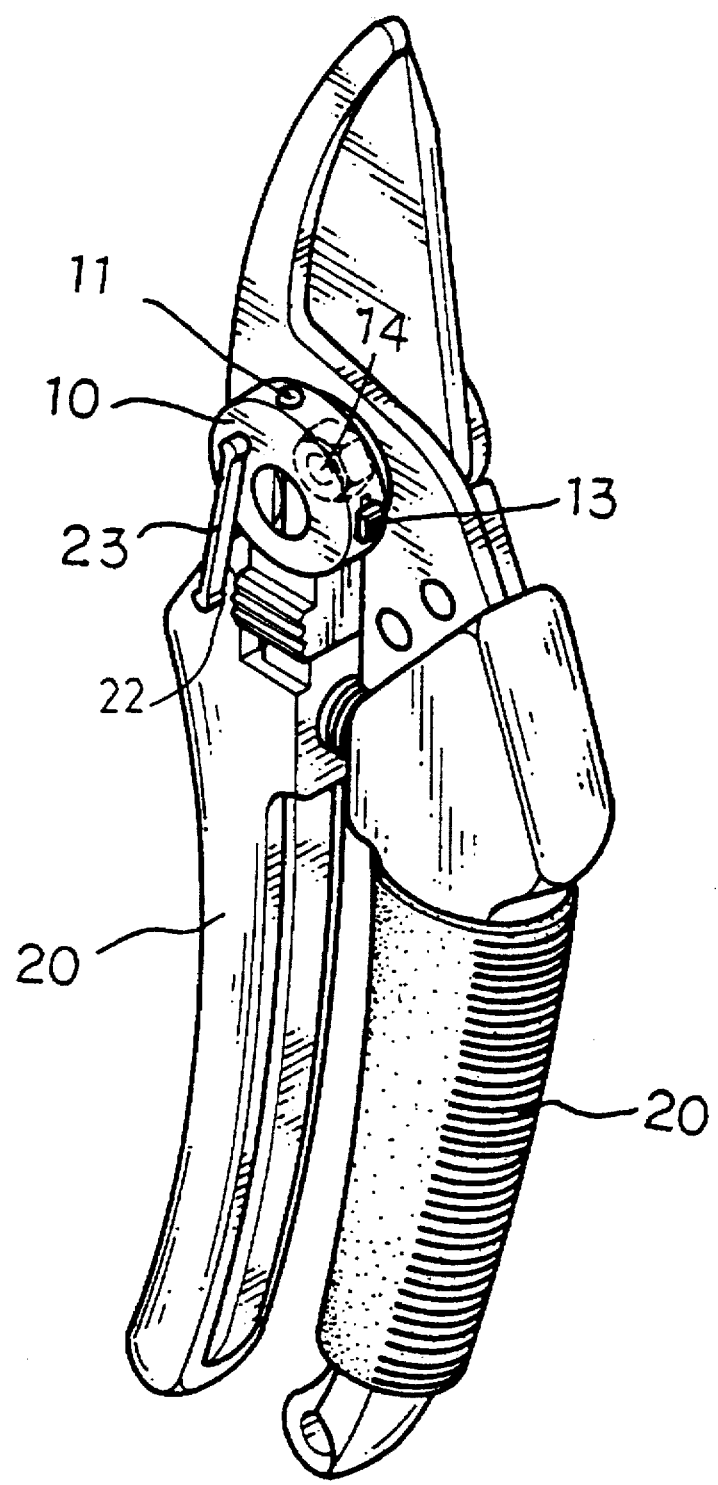
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
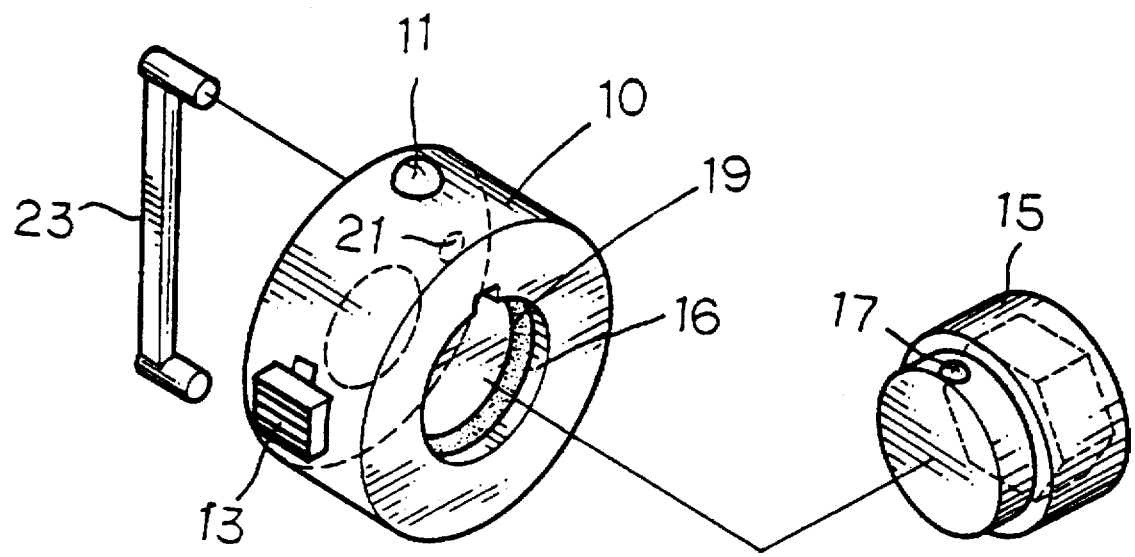
FIG. 2 is an exploded view of the illuminating device.
Figure 3:
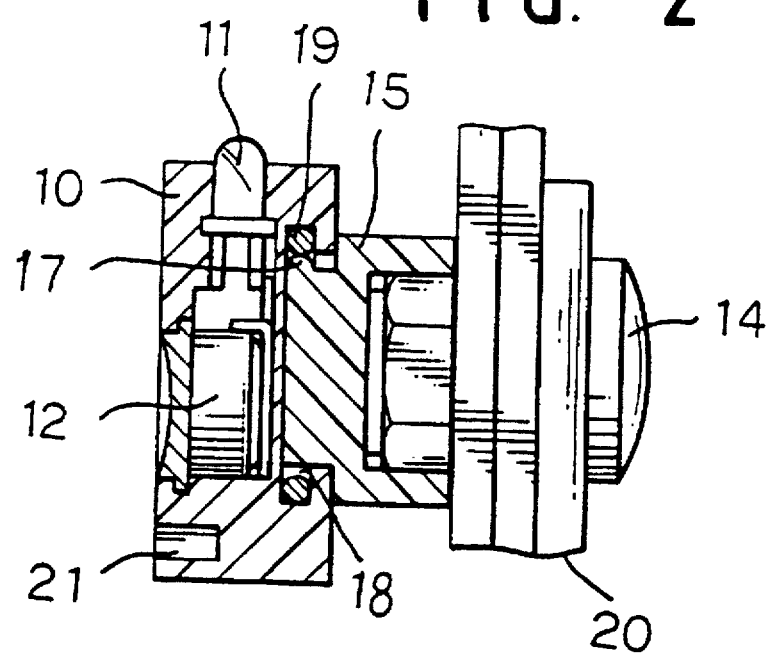
FIG. 3 is a longitudinal sectional view of the illuminating device.
Figures 4, 5:
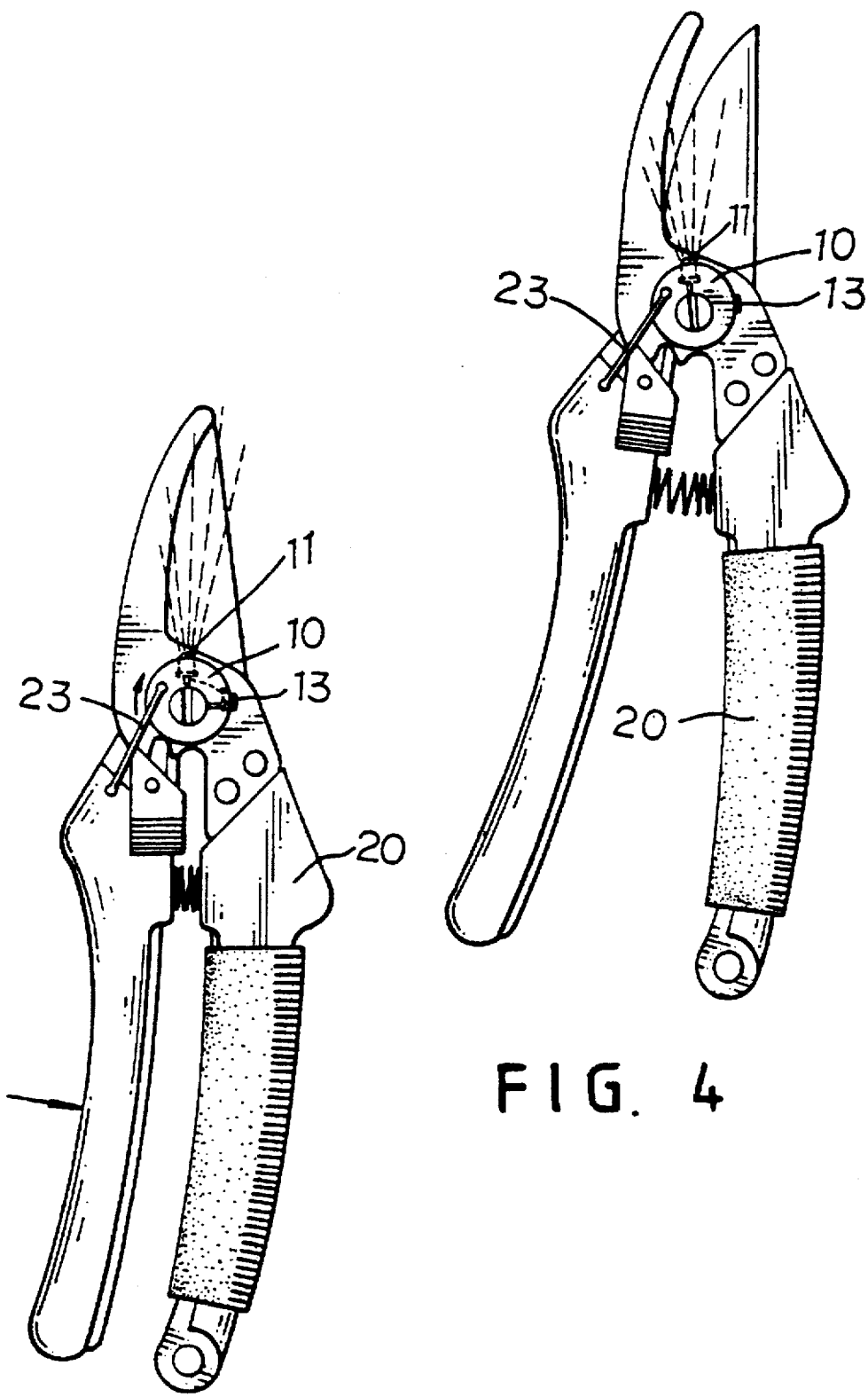
FIGS. 4 and 5 illustrate the working principle of the present invention.

With reference to the drawings and in particular to FIGS. 1, 2 and 3 thereof, the illuminating scissors according to the present invention mainly comprises a pair of blades (shown but not numbered), a light bulb 11, a battery 12, a switch 13, a cylindrical housing 10 and a ferrule 15. The blades are pivotally joined in an intermediate portion thereof by a bolt 14 engaged with a hexagonal lock nut and each having a handle at an end thereof. The ferrule 15 is a cylindrical member formed at an end with a hexagonal recess adapted to receive an end of the hexagonal lock nut which is engaged with the bolt 14 pivotally connected the two blades of the scissors. The ferrule 15 has a small diameter at the other end which is formed with a radial protuberance 17. The housing 10 is generally cylindrical in shape and may be shaped in accordance with the outlook of the scissors. The housing 10 is formed with an axial opening 60 at an end and an inner groove 18 close to the end. A rubber ring 19 is fitted within the inner groove 18 of the housing 10. The cylindrical housing 10 is mounted on the ferrule 15, with the rubber ring 19 in the inner groove 18 of the housing 10 engaged with the radial protuberance 17 of the ferrule 15, so that the housing 10 can be rotated as desired with respect to the ferrule 15. The light bulb 11 is arranged in the cylindrical edge of the housing 10. The battery 12 is fitted in the cylindrical housing 10 and electrically connected with the light bulb 11. The switch 13 is mounted on the housing 10 and electrically connected the battery 12 and the light bulb 11 so that the switch 13 can be used for completing or breaking the electric circuit. The connection between the light bulb 11, the switch 13 and the battery 12 may be of any design well known to those skilled in the art and is not considered a part of the invention. The other end of the cylindrical housing 10 has a pin hole 21 adapted to engage with an end of a resilient linking rod 23. The other end of the resilient linking rod 23 is inserted into a hole 22 in a handle portion of a blade of the scissors 20. Hence, when the handle of the scissors 20 is moved, the cylindrical housing 10 together with the light bulb 11 is rotated. As shown in FIGS. 4 and 5, when the left blade of the scissors 20 is moved to the right, the the light bulb 11 will be rotated to the left thereby enabling the light bulb 11 to give light onto the cutting surface.

Figure 7:
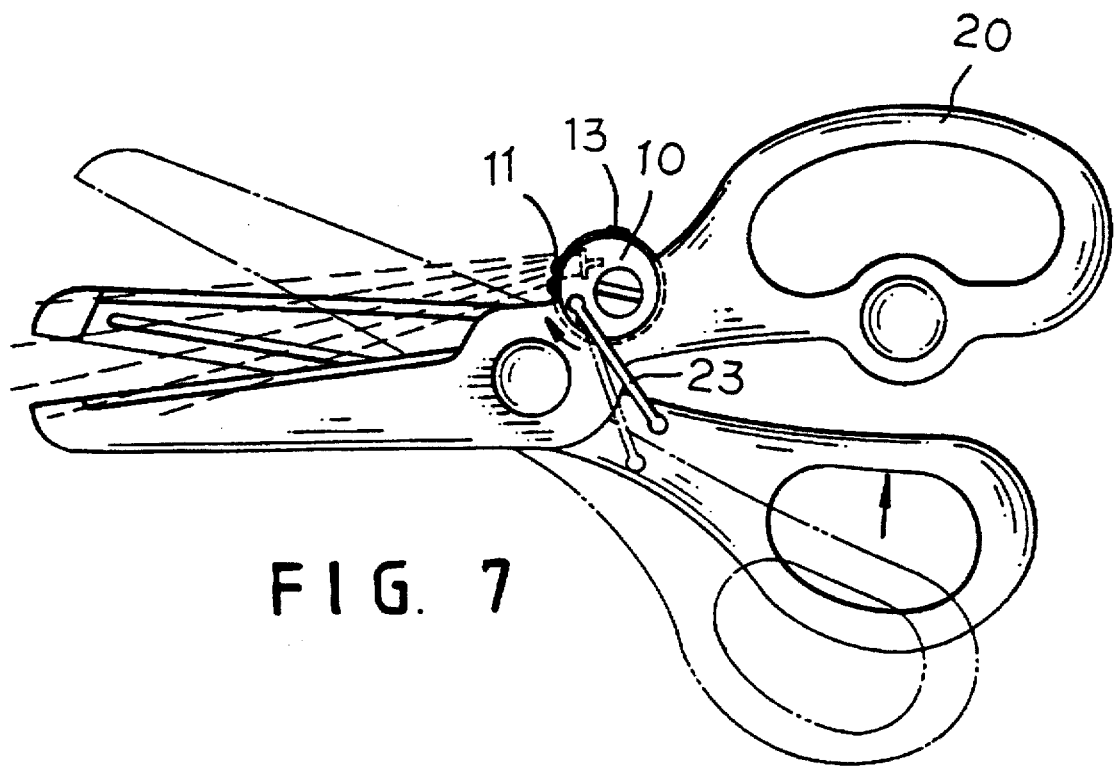
FIGS. 6 and 7 illustrate a second preferred embodiment of the present invention.
Figure 6:
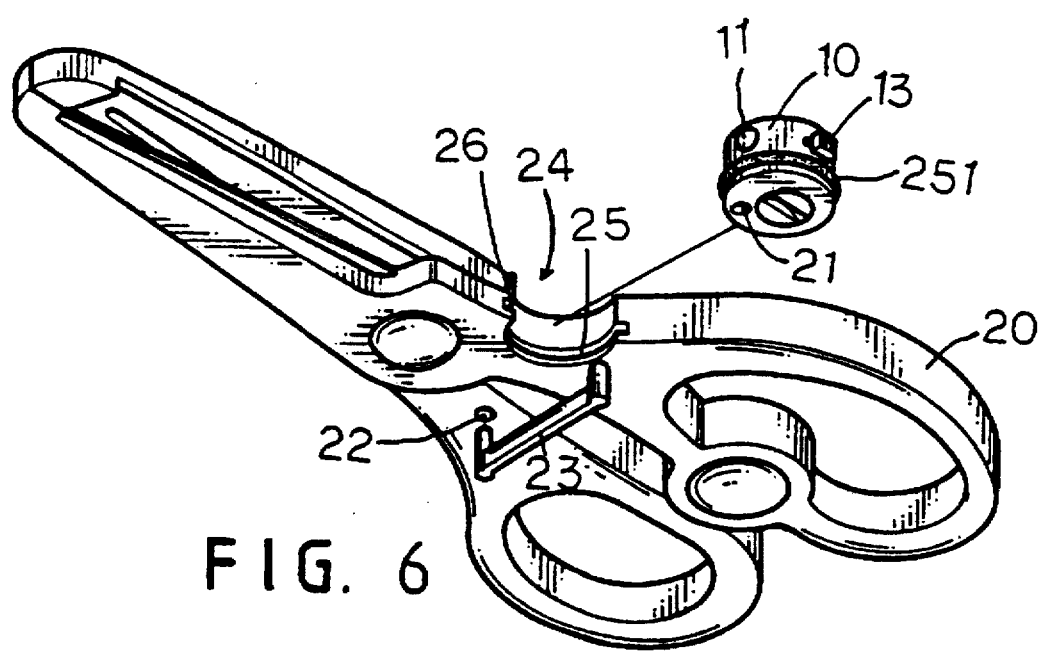

FIGS. 6 and 7 illustrate a second preferred embodiment of the present invention. As illustrated, the handle portion of a blade of the scissors is formed with a circular recess 24 having a groove 25 in which is fitted a rubber member 26. The housing 10 is formed with a circular projection 251 so that when the housing 10 is fitted in the circular recess 24, with the circular projection 251 engaged with the rubber member 26 in the groove 25.

Figure 8:
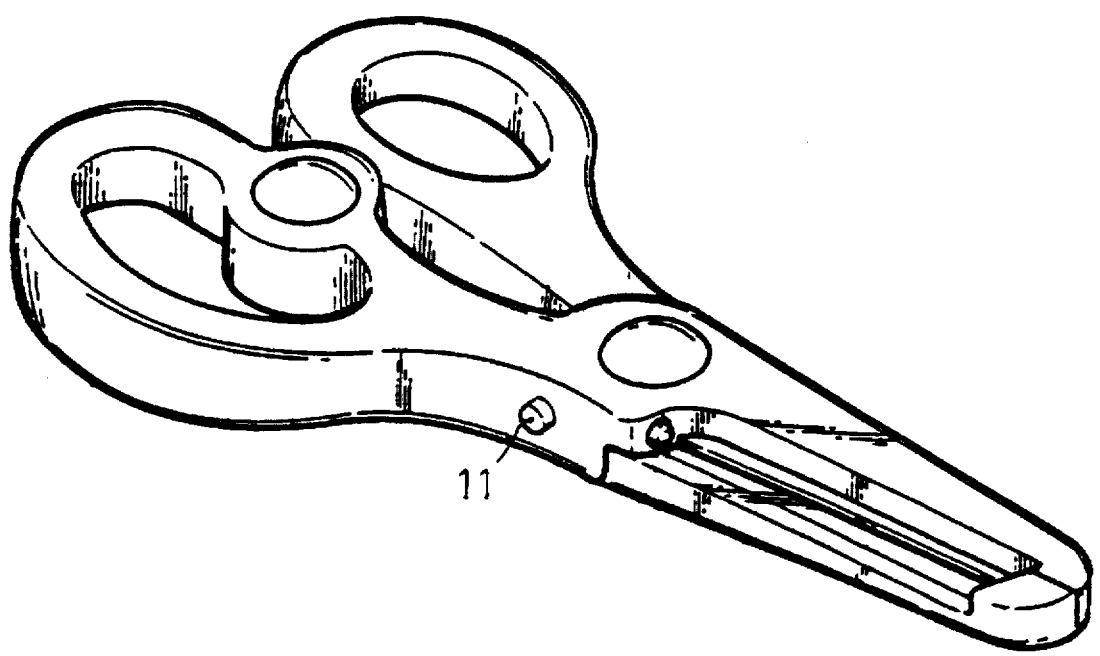
FIGS. 8, 9 and 10 illustrate a third preferred embodiment of the present invention.
Figure 10:
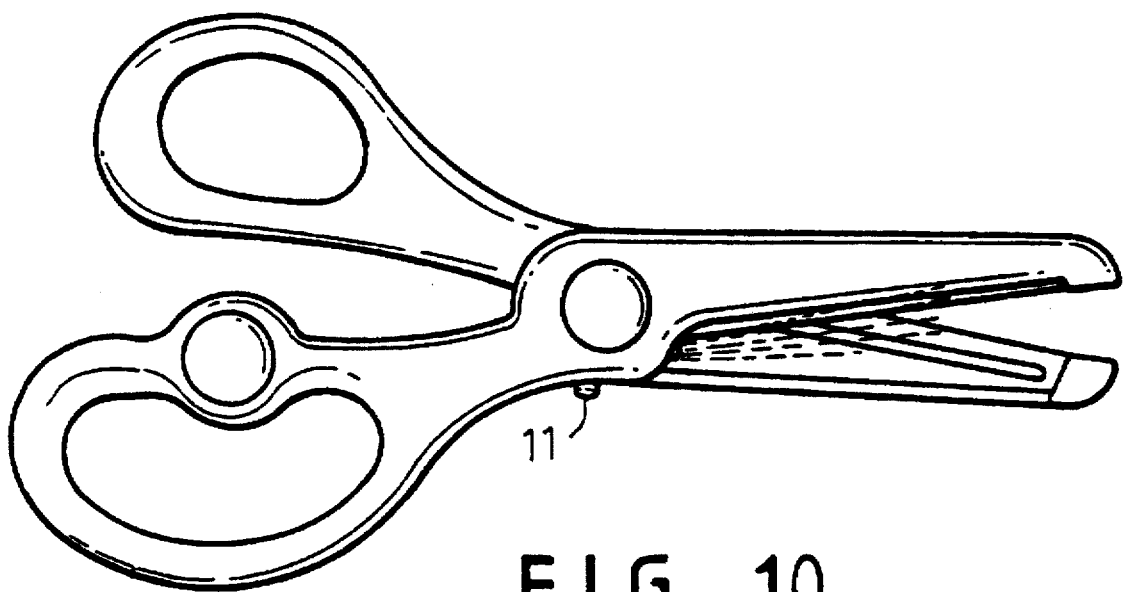
Figure 9:
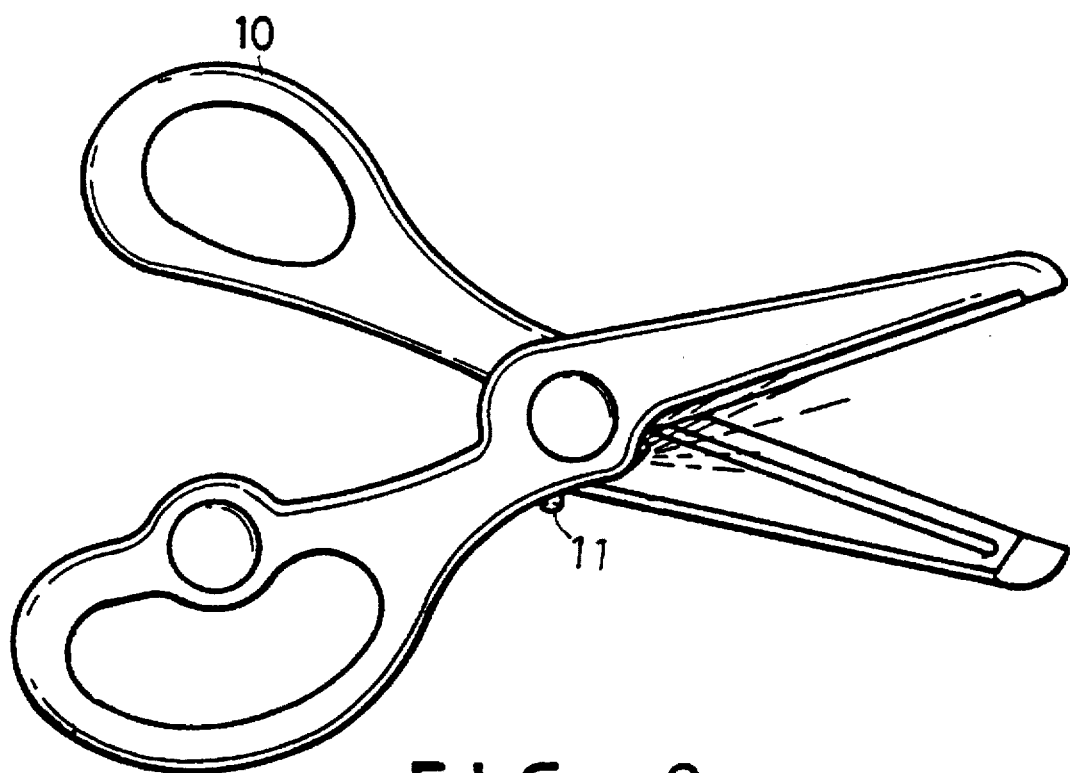
Figure 11:
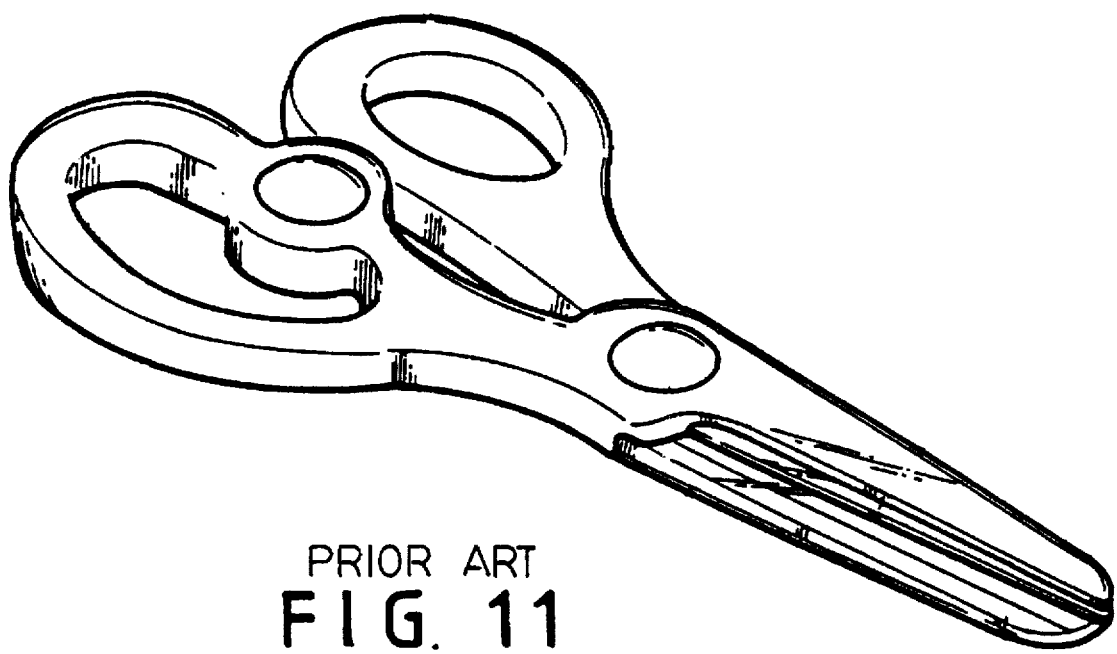
FIG. 11 is a perspective view of a pair of prior art scissors.

FIGS. 8, 9 and 10 illustrate a third preferred embodiment of the present invention. As shown, the illuminating device according to the present invention is fitted within a pair of scissors, with its light bulb 11 protruded out of a blade of the scissors.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. Illuminating scissors comprising:

a pair of blades pivotally joined in an intermediate portion thereof by a bolt engaged with a hexagonal lock nut and each having a handle at an end thereof;

a cylindrical housing mounted on one of said blades;

a light bulb arranged in a cylindrical edge of said cylindrical housing;

a battery fitted in said cylindrical housing and electrically connected with said light bulb; and a switch mounted on said cylindrical housing and electrically connected with said battery and said light bulb; and a linking rod having a first end connected with said housing and a second end with one of said blades.

2. The illuminating scissors as claimed in claim 1, wherein said cylindrical housing is formed at an end thereof with an axial opening and an inner groove close said end of said cylindrical housing, and further comprising a rubber ring fitted in said inner groove of said cylindrical housing, and a cylindrical ferrule formed at an end thereof with a hexagonal recess adapted to receive said hexagonal lock nut and formed at another end thereof with a radial protuberance, said cylindrical ferrule being fitted in said cylindrical housing with said radial protuberance of said cylindrical ferrule engaged with said rubber ring in said inner groove of said cylindrical housing.

3. The illuminating scissors as claimed in claim 1, wherein one of said blades has a handle portion formed with a circular recess having a groove in which is fitted a rubber member, said cylindrical housing being formed with a circular projection and fitted in said circular recess with said circular projection engaged with said rubber member.

4. The illuminating scissors as claimed in claim 1, wherein said cylindrical housing is fitted within one of said blades with said light bulb partly protruded out thereof.

* * * * *